(12) United States Patent
Ebert

(10) Patent No.: US 6,278,991 B1
(45) Date of Patent: Aug. 21, 2001

(54) BROWSER FOR HIERARCHICAL STRUCTURES

(75) Inventor: Peter Ebert, Darmstadt (DE)

(73) Assignee: SAP Aktiengesellschaft, Walldorf (DE)

(*) Notice: Subject to any disclaimer, the term of this patent is extended or adjusted under 35 U.S.C. 154(b) by 0 days.

(21) Appl. No.: 09/134,502

(22) Filed: Aug. 14, 1998

Related U.S. Application Data

(60) Provisional application No. 60/058,946, filed on Aug. 22, 1997.

(51) Int. Cl.[7] ............................ G06F 3/14; G06F 3/00; G06T 17/20
(52) U.S. Cl. ......................... 707/3; 345/357; 345/419; 707/100
(58) Field of Search ..................... 707/3, 101, 102, 707/103, 104, 907; 345/419, 433, 473, 335, 339, 347, 348, 352, 353, 354, 355, 356, 357, 961, 975, 976, 977, 522; 700/17; 382/209

(56) References Cited

U.S. PATENT DOCUMENTS

| | | | |
|---|---|---|---|
| 5,339,433 | 8/1994 | Frid-Nielson | 717/5 |
| 5,491,795 * | 2/1996 | Beaudet et al. | 395/159 |
| 5,517,605 | 5/1996 | Wolf | 707/104 |
| 5,544,302 * | 8/1996 | Nguyen | 395/161 |
| 5,546,529 * | 8/1996 | Bowers et al. | 395/159 |
| 5,630,042 | 5/1997 | McIntossh et al. | 345/340 |
| 5,632,022 * | 5/1997 | Warren et al. | 345/350 |
| 5,771,379 * | 6/1998 | Gore, Jr. | 707/101 |
| 5,815,155 * | 9/1998 | Wolfston, Jr. | 345/357 |
| 5,877,765 * | 3/1999 | Dickman et al. | 345/349 |
| 5,923,328 * | 7/1999 | Griesmer | 345/357 |
| 6,040,834 * | 3/2000 | Jain et al. | 346/356 |
| 6,052,123 * | 4/2000 | Lection et al. | 345/419 |

FOREIGN PATENT DOCUMENTS 96 02889  2/1996 (WO).

OTHER PUBLICATIONS

Kumar H P et al: "Browsing hierarchical data with multi-level dynamic queries and pruning", International Journal of Human-Computer Studies, Jan. 1997, Academic Press, UK, vol. 46, No. 1, pp. 103–124.

* cited by examiner

Primary Examiner—Thomas Black
Assistant Examiner—Te(Susan) Chen
(74) Attorney, Agent, or Firm—Finnegan, Henderson, Farabow, Garrett & Dunner L.L.P.

(57) ABSTRACT

A browser for viewing data representing text, pictures, sounds, virtual reality worlds, links, or other objects, and organized in a hierarchical structure is provided to display and interact with links to the data. A retrieved set of data is displayed in a lens, and subsequently retrieved sets of data that are deeper in the hierarchical structure are displayed in further stacked lenses, creating a visual representation of the hierarchy. A label on each lens provides information on the data originally displayed in the lens. A user may choose to view the originally displayed contents of any lens on the screen. A user may also modify a personal hierarchical data structure comprising links to sets of data in the first hierarchical structure. In doing so, a user creates an entirely new hierarchical structure that customizes the organization of data according to personal preferences and takes advantage of natural association to reduce the number of perceived levels in the new hierarchical data structure.

50 Claims, 13 Drawing Sheets

BROWSER FOR HIERARCHICAL STRUCTURES

This application claim benefit to provisional Application No. 60/058,946 Aug. 22, 1997.

BACKGROUND

With the tremendous advances in computer processing power and network capabilities over the past decade, the popularity of graphical user interfaces for viewing information over a network has increased substantially. Whereas in the past most networks used text displays to convey data from a server to a user, most interfaces today use graphics to convey information in a manner that is not only more pleasing to the eye, but also allows data to be manipulated and presented in ways not possible with pure text.

The first graphical user interfaces for networks were primitive and not entirely intuitive. A user would have to type complex commands to select the data to be displayed or to change the manner the data is displayed. Searches also required complex commands that were not very different from those used for text-based interfaces. However, searches were often the only way to find the desired data, since these primitive interfaces were not able to take full advantage of the links, to the extent that they existed, to quickly move a user from one set of data to another related set of data.

Today, browsers with graphical user interfaces are often used for viewing data across a network. Examples of popular browsers being used today are Netscape Navigator and Microsoft Explorer. Today's browsers can take greater advantage of links between related sets of data, and use these links to navigate among the various sets, including going up and down data hierarchies and revisiting previously viewed data.

While browsers and their graphical user interfaces are becoming increasingly sophisticated, the underlying data itself has become more complex. Data may be organized into huge databases of information that is spread across a network. Data may be organized into objects, including applications and related files, or groups thereof. This data may be organized in larger hierarchies, often many levels deep.

These hierarchically organized objects and groups usually consist of textual data, icons, or two-dimensional images. New development tools, such as JAVA, allow browsers to display more sophisticated objects, such as moving pictures or moving text. However, even these objects are limited by the underlying descriptive language used to create them. For example, today's browsers are not capable of displaying interactive VRML (Virtual Reality Markup Language) worlds.

It has become a challenge to present data in a clear and efficient manner through networks. Browsers can display only a limited amount of information on a user's screen at any given time. If a user chooses to use one lens, or window, to display a given set of data, the data disappears when a user subsequently displays other sets of data. If a user then wishes to revisit a prior set of data, it is usually necessary to visit all the links between the most recently viewed set of data and the desired prior set of data. Although most browsers allow users to create bookmarks for a given set of data, bookmarks are not automatically created, and require extra effort on a user's part. Many browsers also keep a list of recently accessed data, but users are then required to have the list displayed on the screen (taking up valuable screen space) and then remember which set of data is the desired set.

Some browsers allow users to have multiple lenses, or windows, each with a different set of data, displayed on the screen at any given time. However, as the multiple windows start overlapping each other, a user can easily lose track of the order in which the data was visited. Alternatively, a user may wish to recall the hierarchy of the sets of data previously visited, which is also easily forgotten when multiple windows are displayed.

On the other hand, a user may wish to have easy access to links to frequently accessed data. As noted above, most browsers allow a user to create bookmarks. However, as the number of bookmarks increases, it becomes more difficult for the user to quickly find a particular bookmark. This problem may be alleviated somewhat by having a hierarchical structure of bookmarks. However, this is far from a perfect solution, as an increasingly complicated hierarchical structure of bookmarks makes it even more difficult for a user to find a particular link, and time is wasted going through the various levels of the hierarchical structure. Thus, there is also a need to organize links in a manner that makes them readily accessible.

SUMMARY OF THE INVENTION

The present invention relates to an improvement over classic network browsers. The browser being disclosed provides easy access to previously accessed data.

It is an object of this invention to convey data in an efficient manner by displaying the data according to the data's hierarchical structure.

It is another object of this invention to give a user easy access to a hierarchical data structure by providing access to data at several levels within the hierarchical data structure simultaneously.

It is another object of this invention to provide labels for lenses displaying data at various levels within a hierarchical data structure.

It is another object of this invention to organize the display of hierarchical data in a logical manner that is pleasing to the eye.

It is another object of this invention to provide a means for a user to define a personal hierarchical data structure.

It is another object of the invention to use links in a personal hierarchical data structure in conjunction with natural association to access data in another hierarchical data structure having more levels than the personal hierarchical data structure.

It is another object of the invention to utilize colors, shapes, or other attributes to indicate natural association of links in a personal hierarchical data structure.

It is another object of the invention to use links in a personal hierarchical data structure in conjunction with natural association to access data, wherein the data is obtained through channels.

It is another object of the invention to allow exception reporting in conjunction with a personal hierarchical data structure.

It is another object of the invention to organize data into objects and groups of objects that can be represented as three-dimensional animations and VRML-worlds.

It is another object of the invention to display a context-sensitive menu when a cursor is placed on or near an object.

BRIEF DESCRIPTION OF THE DRAWINGS

FIG. 3b is a tree structure representation of the category being represented in FIG. 3a.

FIG. 4b is a tree structure representation of the category being represented in FIG. 4a.

FIG. 5b is a tree structure representation of the category being represented in FIG. 5a.

FIG. 6b is a tree structure representation of the category being represented in FIG. 6a.

FIG. 9b is a tree structure representation of the user-created links shown in FIG. 9a.

FIG. 10b is a tree structure representation of the user-created links shown in FIG. 10a.

FIG. 11b is a tree structure representation of the user-created links shown in FIG. 11a.

DETAILED DESCRIPTION OF THE INVENTION

Figure 1:
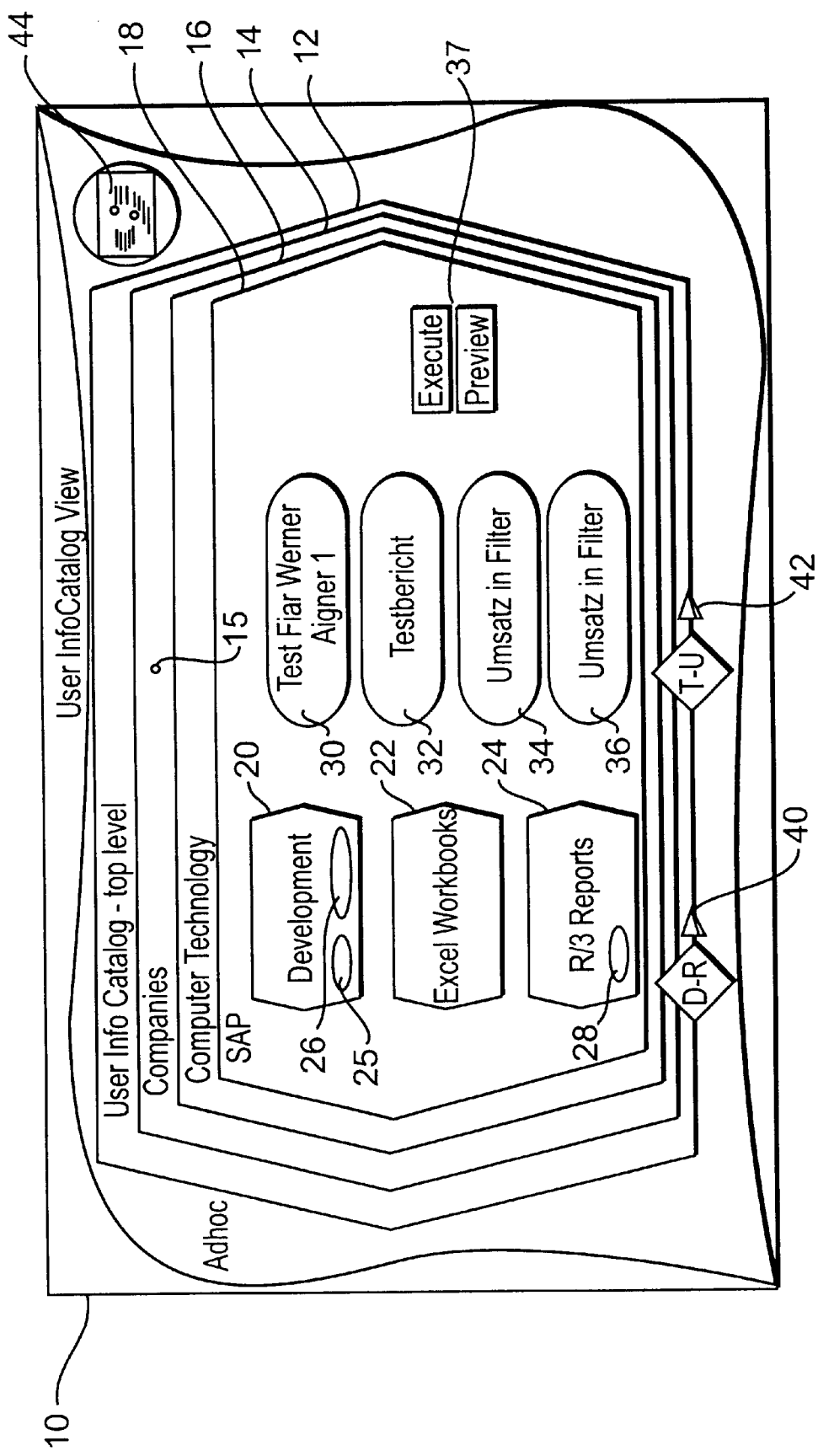
FIG. 1 is a view of a computer screen showing an embodiment of the display for a browser.

For clarity and simplicity, the invention will be described in the context of SAP software, including the marketed R/3 System. A brief description of the R/3 System follows.

R/3 can be described primarily as an online transaction processing system designed to provide integrated processing of all business routines and transactions. It includes enterprise-wide, integrated solutions, as well as specialized applications for individual, departmental functions. R/3 mirrors all of the business-critical processes of the enterprise—finance, manufacturing, sales, and human resources. It also offers various analytical capabilities to supplement the transaction processing function.

Recent paradigm shifts have forced companies to optimize all business processes along the net-value-added chain through the use of modern data processing and enterprise-wide information management. In order to become successful, companies often network with customers and suppliers such that products and services of high quality can be made available with minimal delay in response to customer demands. R/3 achieves these goals with online integration of data in the company.

The R/3 System is based on SAP's client/server architecture which separates the database, application, and presentation components for greater flexibility. This enables enterprises to take advantage of the various benefits of the architecture, including the capability to run across a variety of today's most popular UNIX-based hardware platforms. The R/3 System is designed so that the application systems and system functions are decoupled by a clear layer of architecture, with an application layer and a basis layer. The multilayer architecture of the R/3 System allows optimal load distribution, even in large installations with thousands of users. It has a modular structure with methods for controlling master-slave relationships between individual software components. Special servers linked by communications networks can be used for certain tasks without losing the integration of data and processes in the overall system. Implementation of separate servers for particular tasks makes optimal use of the performance potential and the different cost structures of available hardware architecture. This allows applications to be partitioned into different services and run on different servers. The fundamental services of the R/3 system (graphical presentation services, application services for handling of the application logic, database services for storage and recovery of business data, etc.) are partitioned and may evolve separately while maintaining interoperability.

It will be appreciated that the invention may be practiced using different hardware and different operating systems, and is not restricted to use with R/3. In fact, the invention is designed to be platform-independent.

Furthermore, the invention may be designed as modules that can be imbedded in a container. Thus, Active-X Control or OCX may be used, though the invention should not be construed as being limited to such implementations.

Preferred Embodiments of the Browser

It will be assumed that a hierarchically structured database exists. For illustrative purposes, within this database reside sets of data, including four sets of data with the following category names assigned to them: "User Info Catalog", "Companies", "Computer Technology", and "SAP". "User Info Catalog" is linked to "Companies", which is one hierarchical level below "User Info Catalog". Similarly, "Companies" is linked to "Computer Technology", which is another hierarchical level below. Finally, "Computer Technology" is linked to "SAP", which is a further hierarchical level below.

With reference to FIG. 1, screen 10 shows a preferred embodiment of the invention. Lenses 12, 14, 16, and 18 display graphical representations of hierarchies of sets of data. Although the lenses illustrated in the figures are substantially hexagonal in shape, the lenses may be in the form of rectangles or other shapes in other preferred embodiments. Lens 12 is used to display a graphical representation of the category "User Info Catalog". Since "Companies" is at a deeper hierarchical level than "User Info Catalog", the graphical representation of "Companies" is displayed in the smaller lens 14. At the next level, lens 16 is used to display a graphical representation of "Computer Technology". Finally, lens 18 is used to display a graphical representation of "SAP". Each lens also displays the label or name of the category or set of data associated with that particular lens. Since lens 18 is the smallest lens displayed, it is also currently displaying a graphical representation of the set of data associated with "SAP". The set of data graphically represented in lens 18 contains objects, which may include text, icons, categories, applications, executable objects, such as executable reports, two-dimensional images, three-dimensional images, and VRML worlds.

Lens 18 is displaying a graphical representation of three objects 20, 22, and 24 that are categories one hierarchical level lower than "SAP". Objects 20, 22, and 24 are graphically represented as icons, but selecting one of these will cause a new, smaller lens to appear within lens 18 to display a graphical representation of the category selected. Lens 18 is also displaying graphical representations of objects 30, 32, 34, and 36. In a preferred embodiment, moving a cursor near one of these objects may cause a context-sensitive popup menu to appear with a list of possible commands to be selected. For example, moving a cursor near object 34 causes popup menu or context menu 37 to appear. Since object 34 is an executable object in the example, popup menu or context menu 37 has an "execute" option. In a preferred embodiment, a popup menu or context menu is predefined and is automatically displayed in a format based on the object type and user authorization. Optionally, such a menu could be hierarchical.

A user may go to a deeper level in the hierarchical data structure by selecting a set of data graphically represented on screen 10 that has a deeper hierarchical level than the set of data currently being graphically represented. For example, selecting one of objects 20, 22, or 24 will bring a user to a deeper level. In a preferred embodiment, a graphical representation of an object that is a category will indicate whether the category contains, at the next deeper level, an additional object. For example, symbol or icon 25 and symbol or icon 26 indicate that at least one object that is a category and at least one object that is not a category exist one hierarchical level deeper than object 20. Similarly, symbol or icon 28 indicates that at least one category exists one hierarchical level deeper than object 22.

There are numerous methods by which a user may select an object graphically represented on screen 10. The most popular method used today is to use a mouse to move a mouse cursor to the graphical representation of the object being selected, and clicking on the mouse button. It will be appreciated that other methods, such as making use of a keyboard, are available.

Conversely, a user may wish to go to a higher level in the hierarchical data structure. This may be accomplished by selecting one of the lenses displayed behind the most recently displayed lens. For example, in FIG. 1 a user may select lens 12, 14, or 16 to display the contents of the selected lens. One way to select a lens that is already displayed on screen 10 is to move a mouse cursor to the displayed portion of the lens. For example, a user may view the objects previously displayed in lens 14 by placing the mouse cursor in the general area of point 15 and clicking the mouse button. Alternatively, a user may press a key or key combination on the keyboard, such as an <Alt> key and left arrow key combination, to go up one level. This works in a manner similar to the "Back" button found in many popular browsers today. Selecting a lens on screen 10 will displace all smaller lenses on screen 10.

In a preferred embodiment, a user may navigate within a lens using a mouse, keyboard controls, or other means. For example, a mouse may be used to scroll in any direction within a lens. The left and right arrow keys of a keyboard may be used to scroll left or right, or to select objects having a graphical representation in a lens. Other keys may be used to select objects, for example by pressing the key corresponding to the first letter of the name of an object. In another preferred embodiment, buttons 40 and 42 may be used to scroll through objects. For example, selection of button 40 will cause the graphical representations of objects 20, 22, and 24 to disappear and to be replaced by graphical representations of other categories one hierarchical level lower than "SAP" to appear. Similarly, selection of button 42 will cause the graphical representations of objects 30, 32, 34, and 36 to disappear and to be replaced by graphical representations of additional objects.

Figure 2:
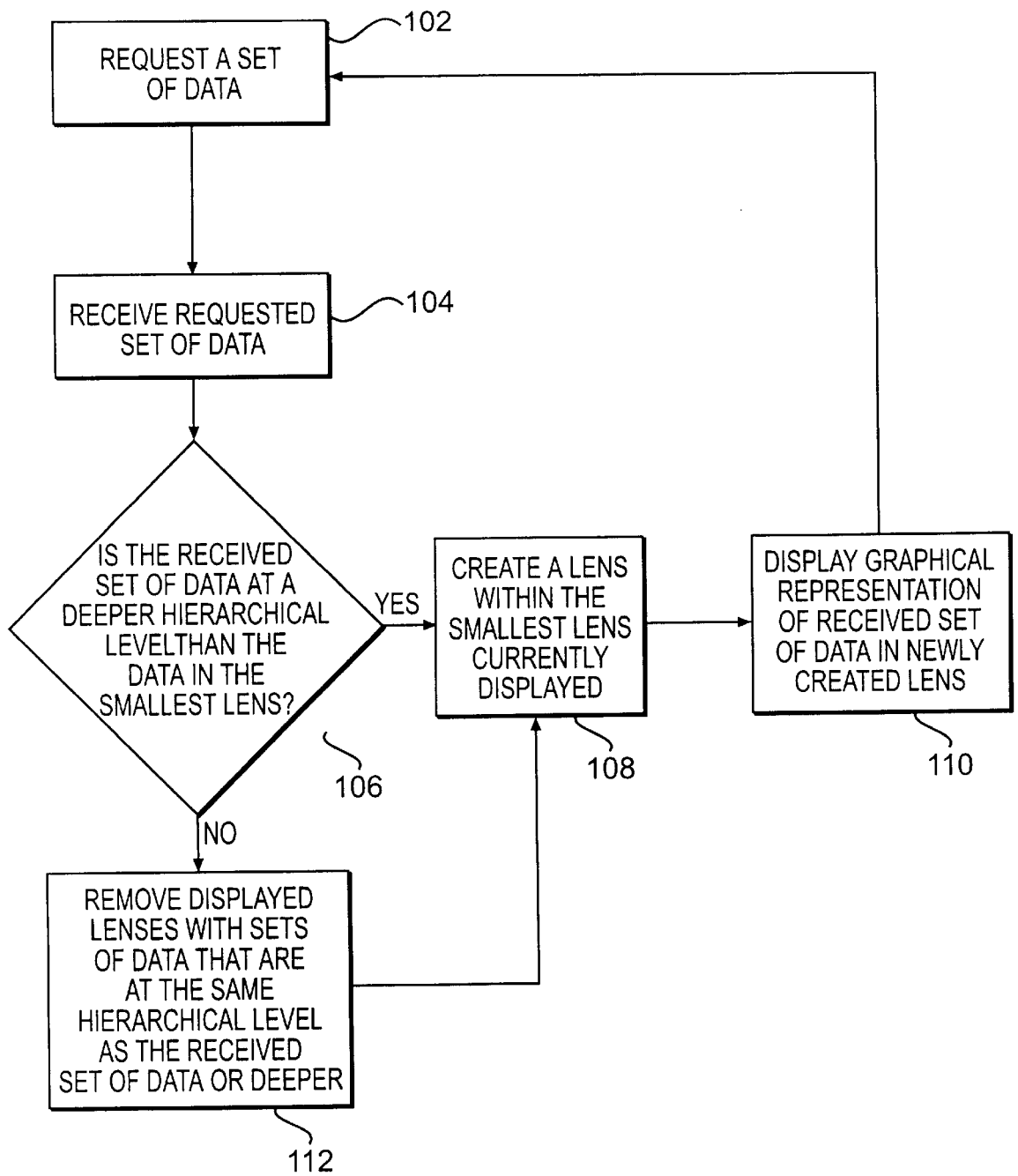
FIG. 2 is a flow chart showing how the display of lenses in a browser is determined.

With reference to FIG. 2, a preferred embodiment for determining the size of lenses is shown in flowchart 100. A computer makes a request 102 for a set of data. Upon receipt 104 of the requested set of data, a comparison 106 is made between the hierarchical level of the received set of data and the hierarchical level of the set of data currently graphically represented within the smallest lens displayed on screen 10. If the received set of data is at a deeper hierarchical level, the creation 108 of a lens that is smaller than the currently displayed lens or lenses is commenced. If the received set of data is not at a deeper hierarchical level, then removal 112 of the lens or lenses displaying graphical representations of any sets of data that are at the same hierarchical level as the received set of data or at a deeper hierarchical level than the received set of data is commenced. After removal 112 occurs, creation 108 of a lens that is smaller than the remaining displayed lens or lenses is commenced. After the creation 108 of a lens, display 110 of a graphical representation of the received set of data commences within the lens created in creation 108. The computer is now ready to make a request 102 for another set of data.

It will be appreciated that flowchart 100 is only one preferred embodiment that there are other possible methods for determining the size of lenses and for displaying them in a fashion consistent with the invention. For example, in another preferred embodiment, if the computer has the information necessary to determine the hierarchical level of a requested set of data, it may be possible to make a comparison 106 before receipt 104 of the requested set of data. For example, if a requested set of data is associated with a URL that indicates the level of the data (such as a URL that uses slash characters to indicate a directory structure), it may be possible to determine the hierarchical level of the requested set of data before it arrives.

In another preferred embodiment, removal 112 of a displayed lens or lenses is not necessary if the creation 108 of a lens and display 110 of a graphical representation of the received set of data are accomplished in such a way that other lens or lenses are blocked off the screen 10.

Examples of Browser Displaying Hierarchical Data

It will again be assumed that a hierarchically structured database exists. For illustrative purposes, within this database reside sets of data, including four sets of data with the following category names assigned to them: "User InfoCatalog", "Key Account Manager", "Current Situation", and "Financial Situation". "User InfoCatalog" is linked to "Key Account Manager", which is one hierarchical level below "User InfoCatalog". Similarly, "Key Account Manager" is linked to "Current Situation", which is another hierarchical level below. Finally, "Current Situation" is linked to "Financial Situation", which is a further hierarchical level below.

Figure 3A:
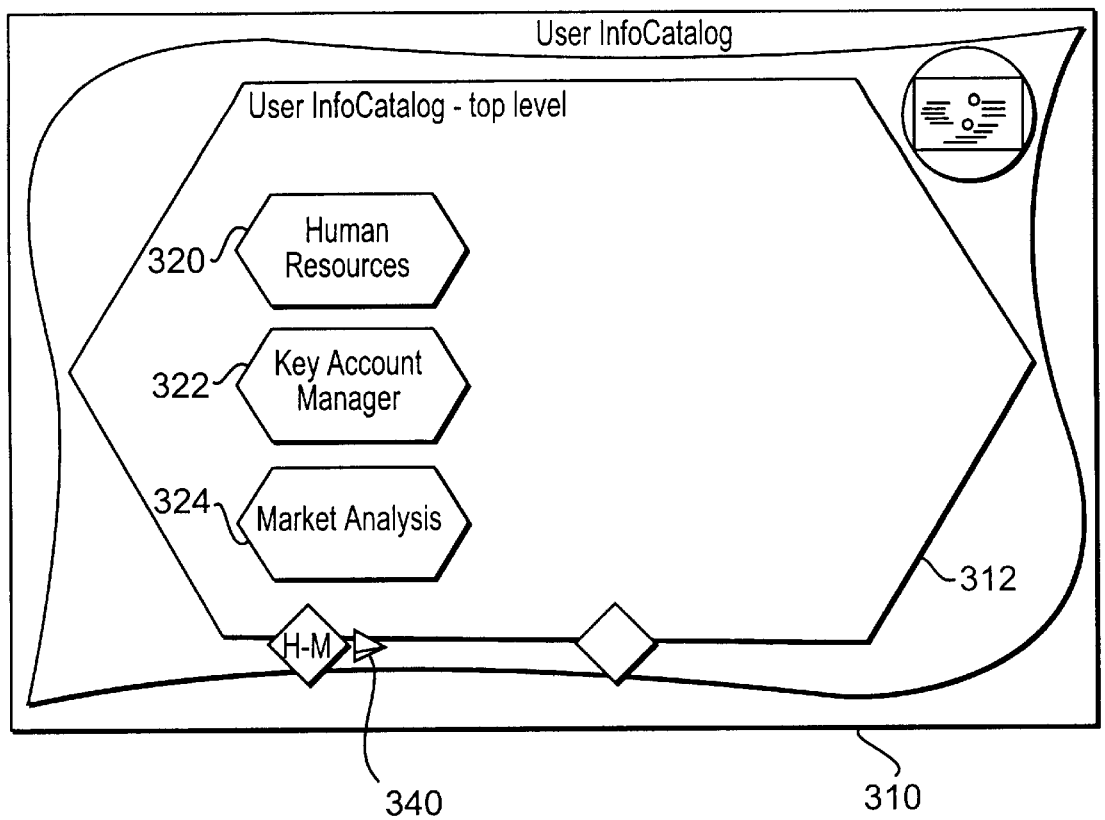
FIG. 3a is a view of a computer screen showing an example of a lens displaying a graphical representation of a category at a first level.
Figure 3B:
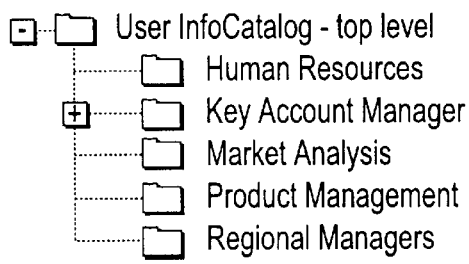

With reference to FIG. 3a, screen 310 shows lens 312, which is displaying a graphical representation of the category "User InfoCatalog". Lens 312 is displaying a graphical representation of three objects 320, 322, and 324 that are categories one hierarchical level lower than "User InfoCatalog". Objects 320, 322, and 324 are graphically represented as icons, but selecting one of these will cause a new, smaller lens to appear within lens 312 to display a graphical representation of the category selected. FIG. 3b shows a tree structure representation 390 of category or object "User InfoCatalog". Note that FIG. 3b indicates that additional objects or categories exist one hierarchical level lower than "User InfoCatalog", but their graphical representations are not currently shown on screen 310. Selection of button 340, which is analogous to button 40 described above, will cause the graphical representations of other categories one hierarchical level lower than "User InfoCatalog" to appear.

Figure 4A:
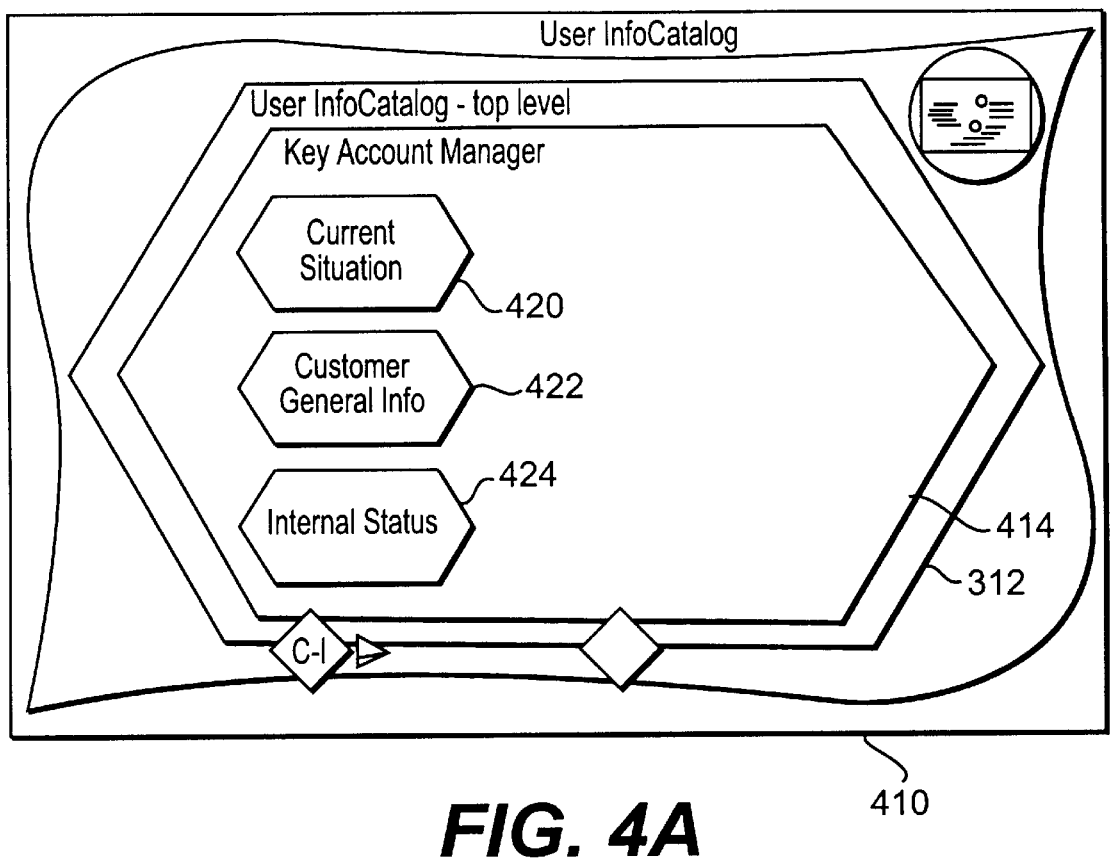
FIG. 4a is a view of a computer screen showing an example of a lens displaying a graphical representation of a category at a second level.
Figure 4B:
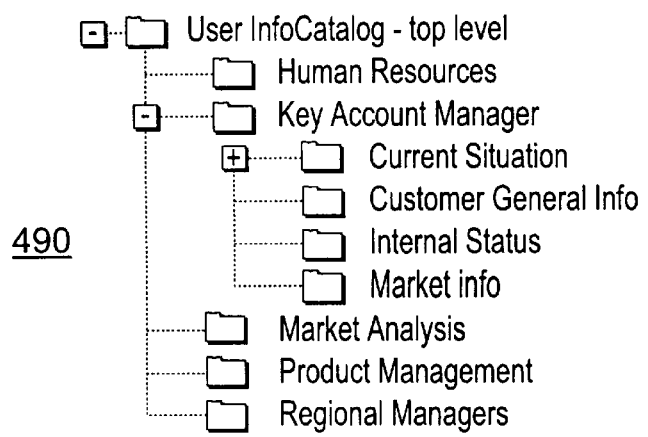

Suppose a user selects object 322, which happens to be category "Key Account Manager". With reference to FIG. 4a, the result is screen 410 showing lens 414, which is displaying a graphical representation of the category "Key Account Manager". Lens 414 is displaying a graphical representation of three objects 420, 422, and 424 that are categories one hierarchical level lower than "Key Account Manager". Objects 420, 422, and 424 are graphically represented as icons, but selecting one of these will cause a new, smaller lens to appear within lens 414 to display a graphical representation of the category selected. FIG. 4b shows a tree structure representation 490 of category or object "Key Account Manager".

Figure 5A:
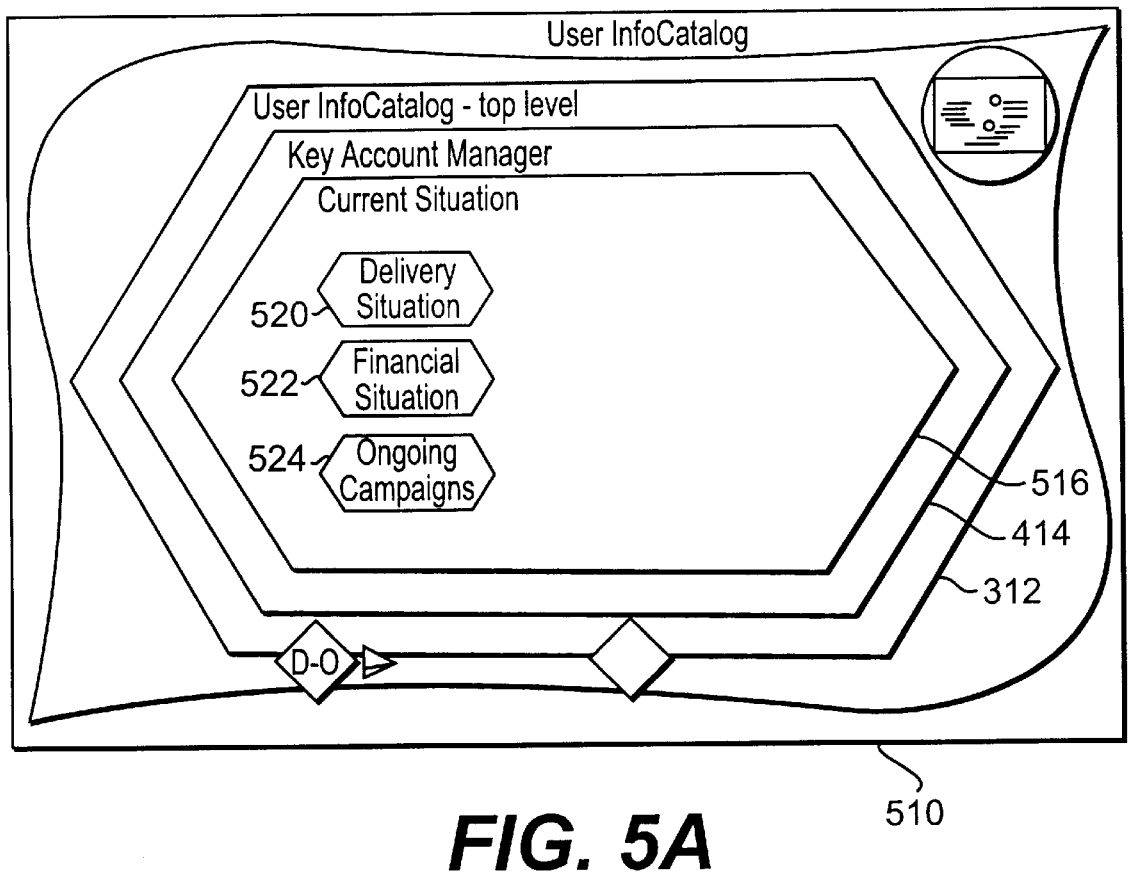
FIG. 5a is a view of a computer screen showing an example of a lens displaying a graphical representation of a category at a third level.
Figure 5B:
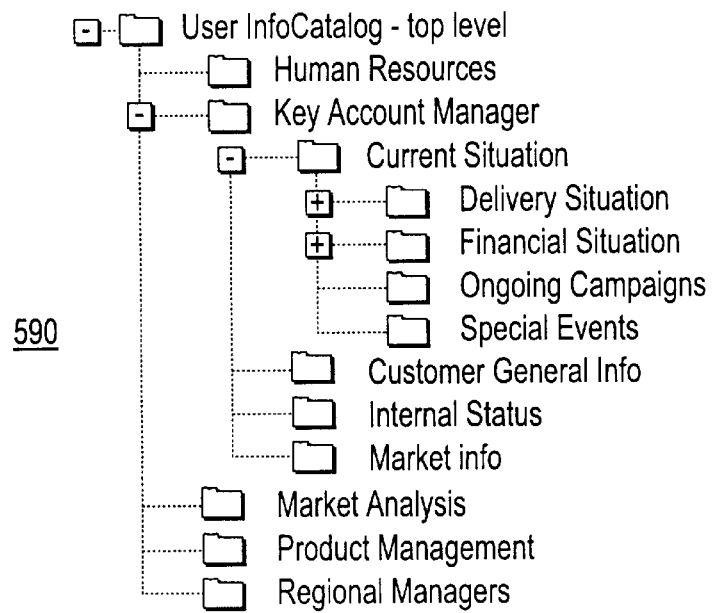

Now suppose a user selects object 420, which is category "Current Situation". With reference to FIG. 5a, the result is screen 510 showing lens 516, which is displaying a graphical representation of the category "Current Situation". Lens 516 is displaying a graphical representation of three objects 520, 522, and 524 that are categories one hierarchical level lower than "Current Situation". Objects 520, 522, and 524 are graphically represented as icons, but selecting one of these will cause a new, smaller lens to appear within lens 516 to display a graphical representation of the category selected. FIG. 5b shows a tree structure representation 590 of category or object "Current Situation".

Figure 6A:
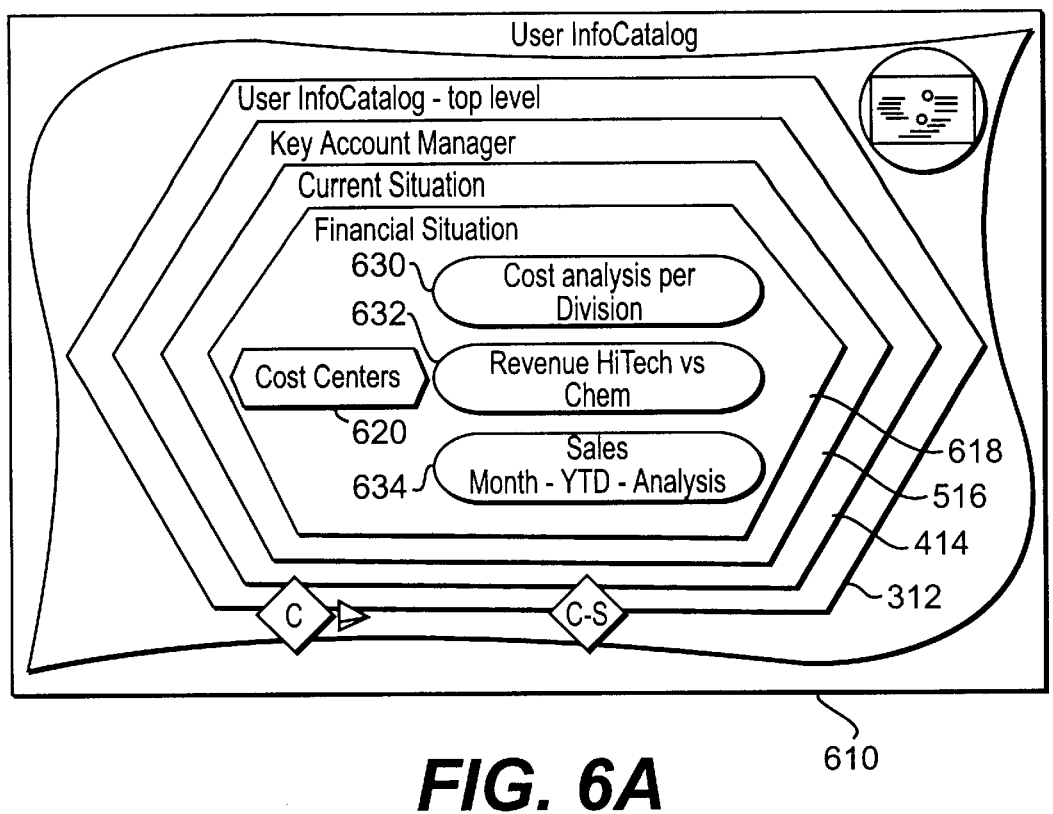
FIG. 6a is a view of a computer screen showing an example of a lens displaying a graphical representation of a category at a fourth level.
Figure 6B:
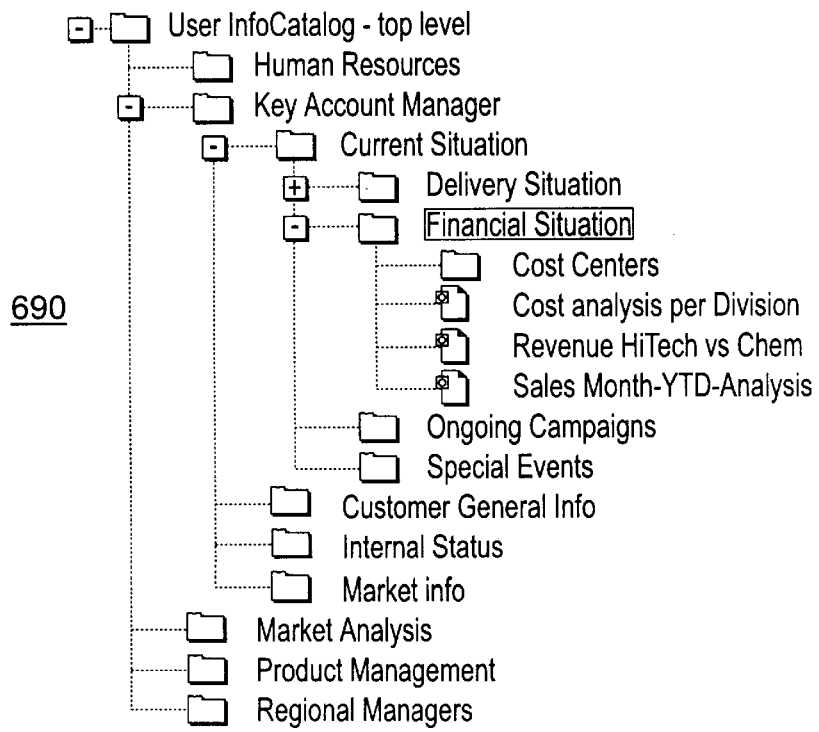

Finally, suppose a user selects object 522, which is category "Financial Situation". With reference to FIG. 6a, the result is screen 610 showing lens 618, which is displaying a graphical representation of the category "Financial Situation". Lens 618 is displaying a graphical representation of object 620 that is a category one hierarchical level lower than "Financial Situation". Lens 618 is also displaying graphical representations of objects 630, 632, and 634, which, in a preferred embodiment, are not categories. FIG. 6b shows a tree structure representation 690 of category or object "Financial Situation".

While screen 610 is being displayed, a user may select another lens to return to a prior screen. By way of example, a user may select lens 414 (by, in a preferred embodiment, clicking in an area between the borders of lens 516 and lens 414), resulting in screen 410 being displayed.

Example of a Simplified Object Model of the Browser

A method of creating the browser described above is to use object-oriented programming. A preferred method is to use an object-oriented programming editor, such as LINGO. It is to be appreciated by those skilled in the art that C++ and other languages having object-oriented programming capabilities may be used to create the browser described above. It should also be appreciated that programming languages and tools are constantly evolving, and such programming languages and tools may also be well-suited for the creation of the browser.

To avoid confusion, the word "Object" is capitalized in the following paragraph to distinguish it from the word "object" previously defined.

Figure 7:
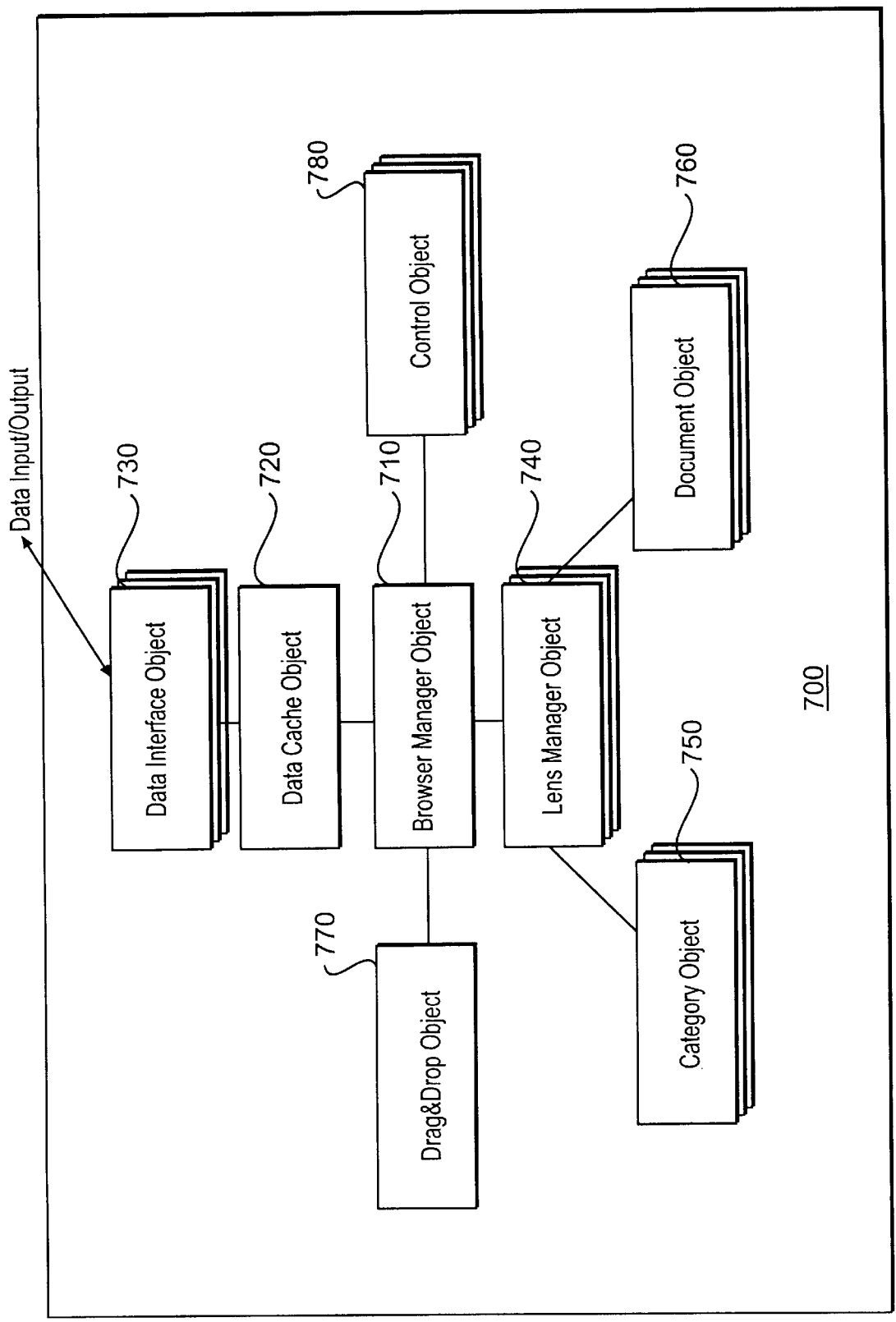
FIG. 7 is an example of a simplified object model showing how a hierarchical browser may be programmed.

Referring to FIG. 7, simplified Object Model 700 showing how the browser may be programmed is shown. Browser Manager Object 710 builds the graphic visualization of the browser and coordinates user interaction with browser controls. Data Cache Object 720 allows for temporary storage of sets of retrieved data, which are obtained through Data Interface Object 730. Lens Manager Object 740 creates a lens for displaying graphical representations of sets of data. Such sets of data may include objects that are categories, which are controlled by Category Object 750, and may include objects that are not categories, which objects are controlled by Document Object 760. Drag and Drop Object 770 allows a user to select an object and drag it to another location (this is described below). Finally, Control Object 780 could coordinate the options or commands in a popup menu to be displayed, or any other user interaction, and coordinates the taking of the proper action when an option or command is selected.

It is to be appreciated that simplified Object Model 700 is but one way to organize the implementation of the browser.

A Preferred Embodiment of the User Favorites Screen

A user may wish to retain quick access to one or more objects without having to follow the links of the hierarchical data structure of the database. In a preferred embodiment, quick access is accomplished via a user favorites screen 50 shown in FIG. 8. A preferred method for switching from screen 10 to user favorites screen 50 is by selecting cluster view icon 44 shown in FIG. 1. A preferred method for switching from user favorites screen 50 to screen 10 is by selecting icon 88. A preferred method alternative to these preferred methods is to display both screen 10 and user favorites screen 50 on one physical display simultaneously.

A link to an object may be created in user favorites screen 50 by the following preferred method. A user selects the desired object—object 32, by way of example. The user places a mouse cursor on object 32, presses on a mouse button, drags the cursor over to cluster view icon 44, and releases the mouse button. User favorites screen 50 is then displayed, and the user moves the mouse cursor to a desired location on user favorites screen 50. The user then releases the pressed mouse button. The process of selecting an object with a mouse cursor, pressing on a mouse button, dragging the cursor to another location, and releasing the mouse button is referred to as "drag and drop". It will be appreciated that there are numerous other methods by which a link to an object may be created in user favorites screen 50.

In an alternative preferred embodiment, user favorites screen 50 may be used in conjunction with hierarchical structures without using the browser disclosed herein. For example, any hierarchical data controller that allows selection of objects within a hierarchical data structure may be used to select objects for the purpose of creating links to the selected objects in user favorites screen 50. An alternative preferred embodiment wherein a user favorites screen is used in conjunction with channels is described later.

User favorites screen 50 currently displays a graphical representation of a link to object 30. This is an example of a graphical representation of a link to an object that currently also has a graphical representation on screen 10. A user may access object 30 via screen 10 or via user favorites screen 50. Optionally, the graphical representation of an object that also has a graphical representation of a link to the object on user favorites screen 50 receives a graphical attribute indicating that the object has been selected as a user favorite object.

In a preferred embodiment, a link created on user favorites screen 50 has the same graphical representation as the pertinent object on screen 10. In an alternative preferred embodiment, the graphical representation of a link created on user favorite screen 50 inherits attributes, such as color, shading, or shape, associated with a cluster object link on user favorite screen 50. By way of example, a user may use a mouse to drag the graphical representation of the link to object 30 over to the graphical representation of cluster object link 60 to cause the graphical representation of the link to object 30 to inherit the shading of the graphical representation of cluster object link 60.

In a preferred embodiment, a user may create hierarchies for the links graphically represented on user favorites screen 50. For example, a cluster object link, such as cluster object link 60, 62, or 64, may be created by clicking on button 86. The user may also type in a name for a cluster object link (such as the name "Workbooks" given to cluster object 60). In the example on user favorites screen 50, cluster object link 60 is one hierarchical level above object links 70, 72, 74 and is also linked to them. A link is created between a cluster object link, such as cluster object link 60, and one or more object links, such as object links 70, 72, 74, by using a mouse to drag the graphical representations of object links 70, 72,74 to the graphical representation of cluster object link 60. Optionally, a user may create, move, rename, and remove cluster object links and object links. In a preferred embodiment, moving a cursor near the graphical representation of an object link may cause a context-sensitive popup menu to appear with a list of possible commands or options to be selected. For example, moving a cursor near the graphical representation of object link 75 causes popup menu or context menu 77 to appear. Since object link 75 is a link to an executable object in the example, popup menu or context menu 77 has an "execute" option and a "preview" option, in addition to "rename" and "remove" options. In a preferred embodiment, a popup menu or context menu is predefined and is automatically displayed in a format based on the object type and user authorization. For example, "remove" appears as an option only when there is authorization to remove the object link. Optionally, a popup menu or context menu could be hierarchical.

In a preferred embodiment, user favorites screen 50 may be saved (e.g., stored on a server and/or on computer-readable storage media) in such a way that the user-specified relative positions of the graphical representations of object links and cluster object links as they appear on user favorites screen 50 are also saved.

In a preferred embodiment, user favorites screen 50 may be used in conjunction with exception reporting. For example, an administrator may define an object to be associated with exception reporting, wherein certain conditions associated with an object will cause a user to be alerted to the occurrence of an exception. For example, a user may be alerted by having the graphical representation of an object link flash.

Figure 8:
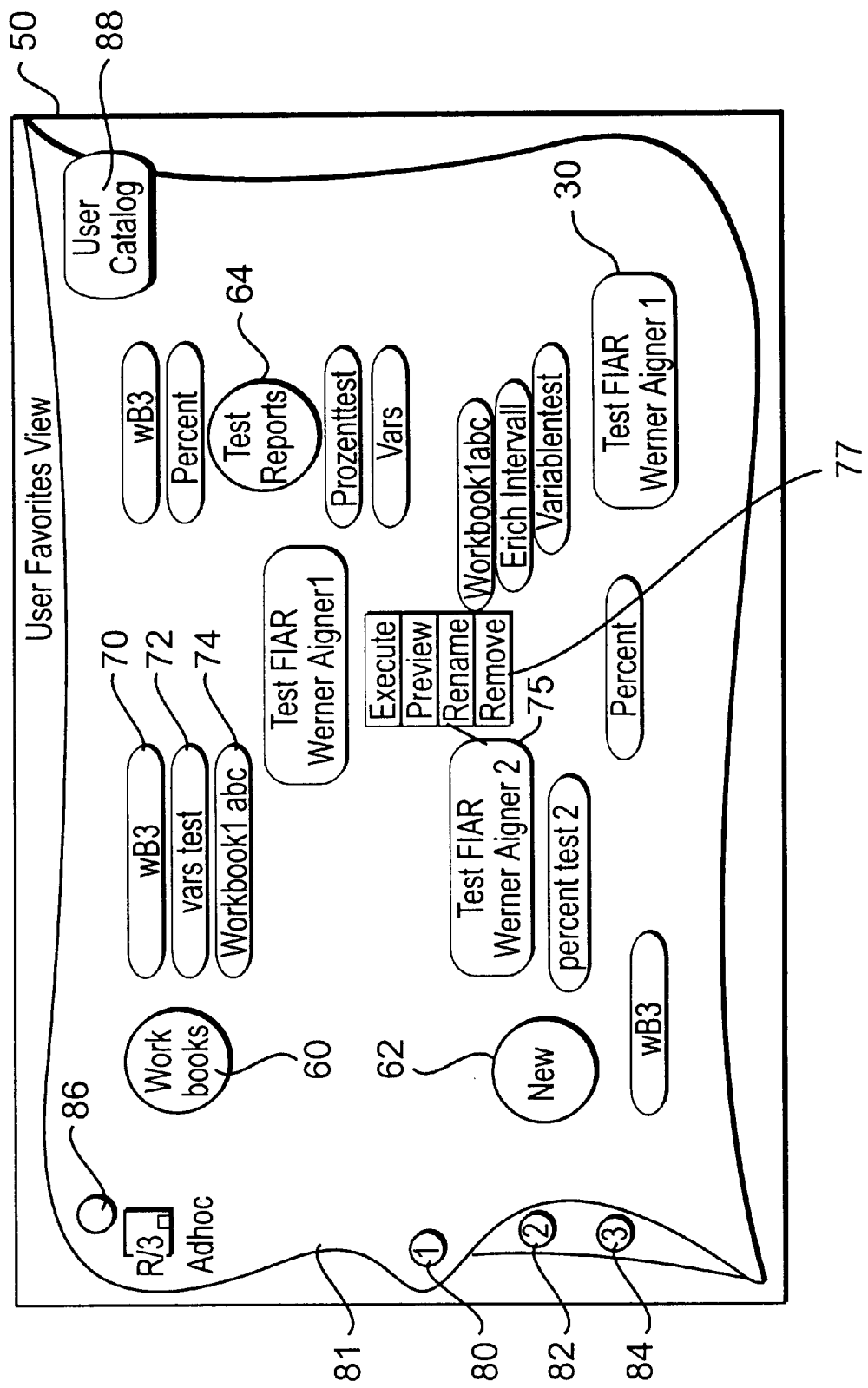
FIG. 8 is a view of a computer screen showing an embodiment of the user favorites screen containing graphical representations of user-created links.

In a preferred embodiment, user favorites screen 50 is capable of displaying different shelves of graphical representations of links. In FIG. 8, user favorites screen 50 is currently displaying a first shelf 81. By selecting button 82 or button 84, a user may select other shelves that display graphical representations of other links. By pressing button 80, a user may then return to displaying shelf 81. In a preferred embodiment, the graphical representation of an object link may be moved from one shelf to another shelf. A user may also move the graphical representation of a cluster object link from one shelf to another shelf, in which case the graphic representations of all the object links associated with that cluster object link also move to the other shelf. In another preferred embodiment, the shelf with the graphical representation of an object link associated with exception reporting may flash when alerting a user of an exception event.

Since the hierarchical organization of links whose graphical representations are displayed on user favorites screen 50 is displayed in a manner of natural association, the hierarchical nature of the links is not as readily perceived by a user. Since a user may create a cluster object link, such as cluster object link 60, and cause object links, such as object links 70, 72, and 74 to be linked to the cluster object link, a hierarchical relationship is created that is displayed as a collection of proximate graphical representations of cluster object links and object links on the screen. The examples below illustrate some of the advantages of natural association.

Examples of User Favorite Screens

The following examples illustrate the versatility of user favorites screens.

Figure 9A:
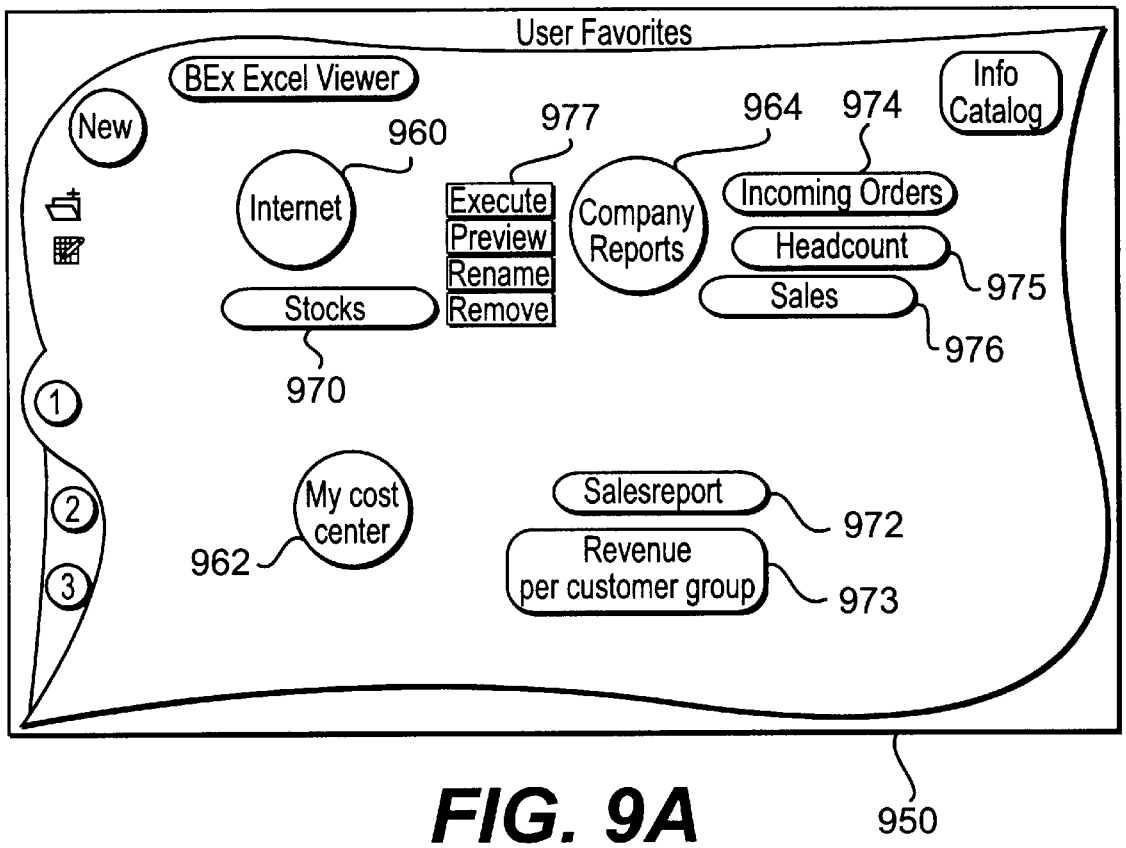
FIG. 9a is a view of a computer screen showing an embodiment of a display containing graphical representations of user-created links, wherein a popup menu is displayed.
Figure 9B:
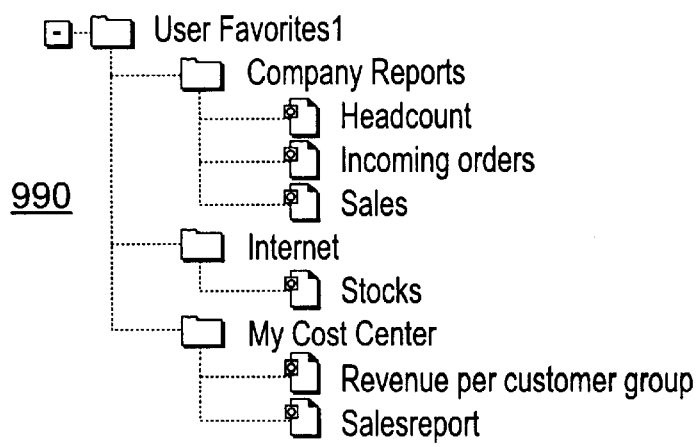

Referring to FIG. 9*a,* user favorites screen 950 currently displays graphical representations of cluster object links 960, 962, 964. Object link 970 is linked to cluster object link 960 (the display of popup menu or context menu 977 indicates that a cursor is near the graphical representation of object link 970). Object links 972, 973 are linked to cluster object link 962, while object links 974, 975, 976 are linked to cluster object link 964. FIG. 9*b* shows a tree structure representation 990 of the cluster object links and object links whose graphical representations are displayed on user favorites screen 950. The graphical representations make the natural associations between the various groups of links apparent in a way that is not possible with a tree structure. The physical layout of the links, which may be defined by a user, obviates the need to display the hierarchical structure of the links.

Figure 10A:
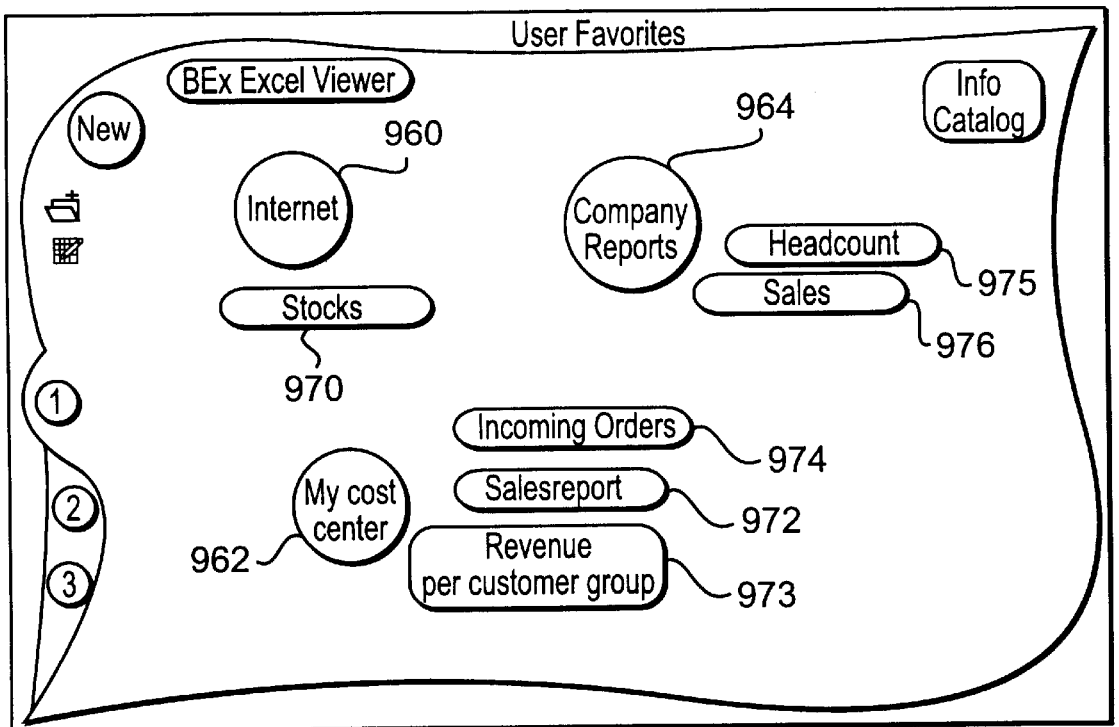
FIG. 10a is a view of a computer screen showing an embodiment of a display containing graphical representations of user-created links, wherein a link has been moved.
Figure 10B:
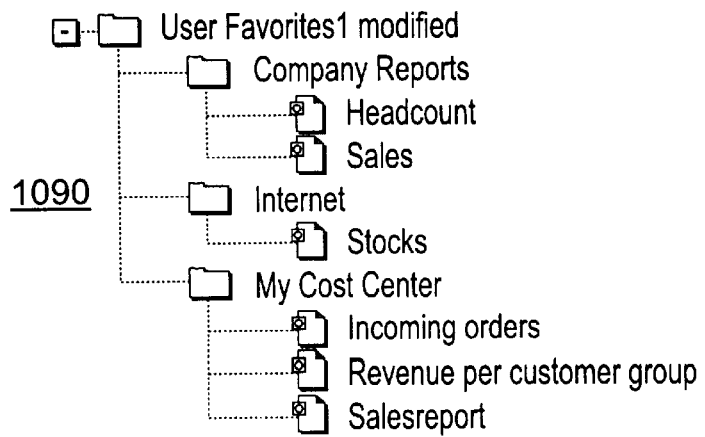

In a preferred embodiment, if a user were to move the graphical representation of object link 974 by, for example, moving a cursor to the graphical representation of object link 974, pressing a mouse button, dragging the graphical representation of object link 974 over to touch the graphical representation of cluster object link 962, then dragging the graphical representation of object link 974 to a point on user favorites screen 950 that is just above the graphical representation of object link 972, and releasing the mouse button, the result would look like user favorites screen 1050 in FIG. 10*a.* This operation would remove the link between object link 974 and cluster object link 964, and create a link between object link 974 and cluster object link 962. FIG. 10*b* shows a tree structure representation 1090 of the cluster object links and object links whose graphical representations are displayed on user favorites screen 1050.

In a preferred embodiment, an attribute of the graphical representation of object link 974 would be altered by the operation described above. By way of example only, assume that the graphical representation of cluster object link 962 is shaded red while the graphical representation of cluster object link 964 is shaded green. The graphical representation of object link 974 would be shaded green in user favorites screen 950, but would automatically switch to a shade of red in user favorites screen 1050.

Figure 11A:
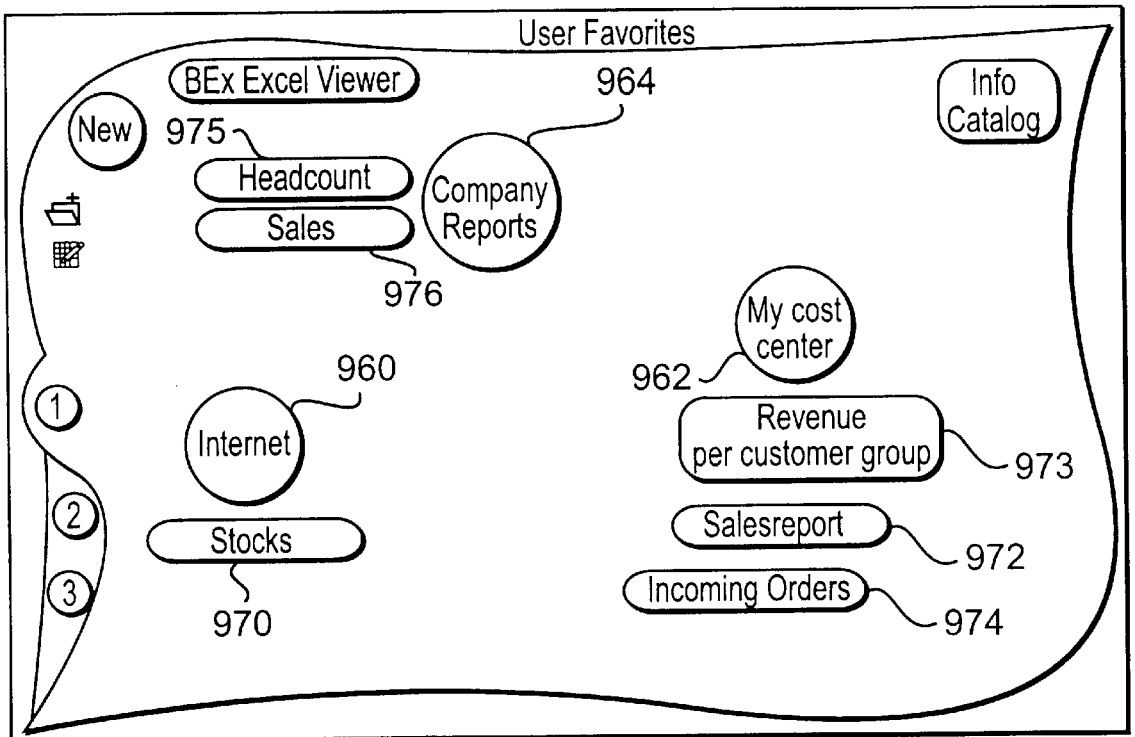
FIG. 11a is a view of a computer screen showing an embodiment of a display containing graphical representations of user-created links, wherein the physical representations of the links have been moved on the display without changing the hierarchical structure of the links.
Figure 11B:
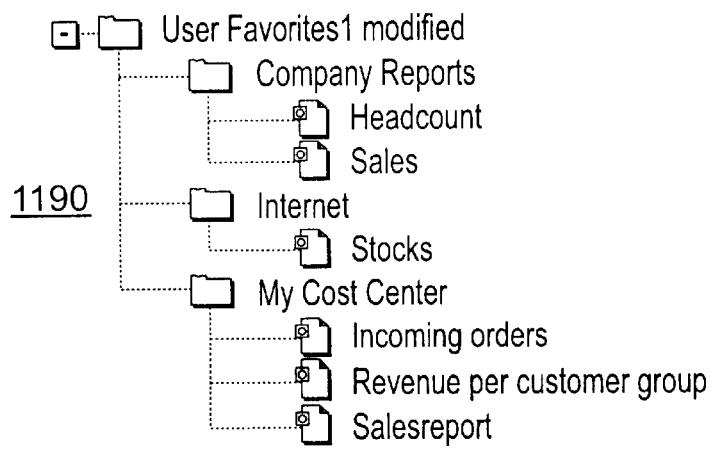

To further illustrate the versatility of the user favorites screen, user favorites screen 1150 in FIG. 11a shows a different physical layout for the graphical representations of the links that are graphically represented in user favorites screen 1050. FIG. 11b shows a tree structure representation 1190 of the cluster object links and object links whose graphical representations are displayed on user favorites screen 1150. It is apparent that tree structure representation 1090 and tree structure representation 1190 are the same. When a user drags and drops the graphical representation of a cluster object link, the graphical representations of any object links that are linked to that cluster object link are also moved. For example, moving the graphical representation of cluster object link 960 from the top half of user favorites screen 1050 to the bottom half of user favorite screen 1150 causes the graphical representation of object link 970 to move as well. Furthermore, the drag and drop technique may also be used to move a graphical representation of an object link within the vicinity of a cluster object link. Thus, it is a simple matter to move the graphical representations of object links 975, 976 from the right of the graphical representation of cluster object link 964 (as in user favorites screen 1050) to the left of the graphical representation of cluster object link 964 (as in user favorites screen 1150). In a preferred embodiment, this operation would require two drag and drop operations. For example, a user may drag and drop the graphical representation of object link 975 and subsequently drag and drop the graphical representation of object link 976. A further advantage of being able to customize the layout of the physical representation of objects is that a user, if it is so desired, may create a pseudo-hierarchy of object links simply by indenting graphical representations of certain object links relative to graphical representations of other object links.

Another Preferred Embodiment of the User Favorites Screen

Figure 12:
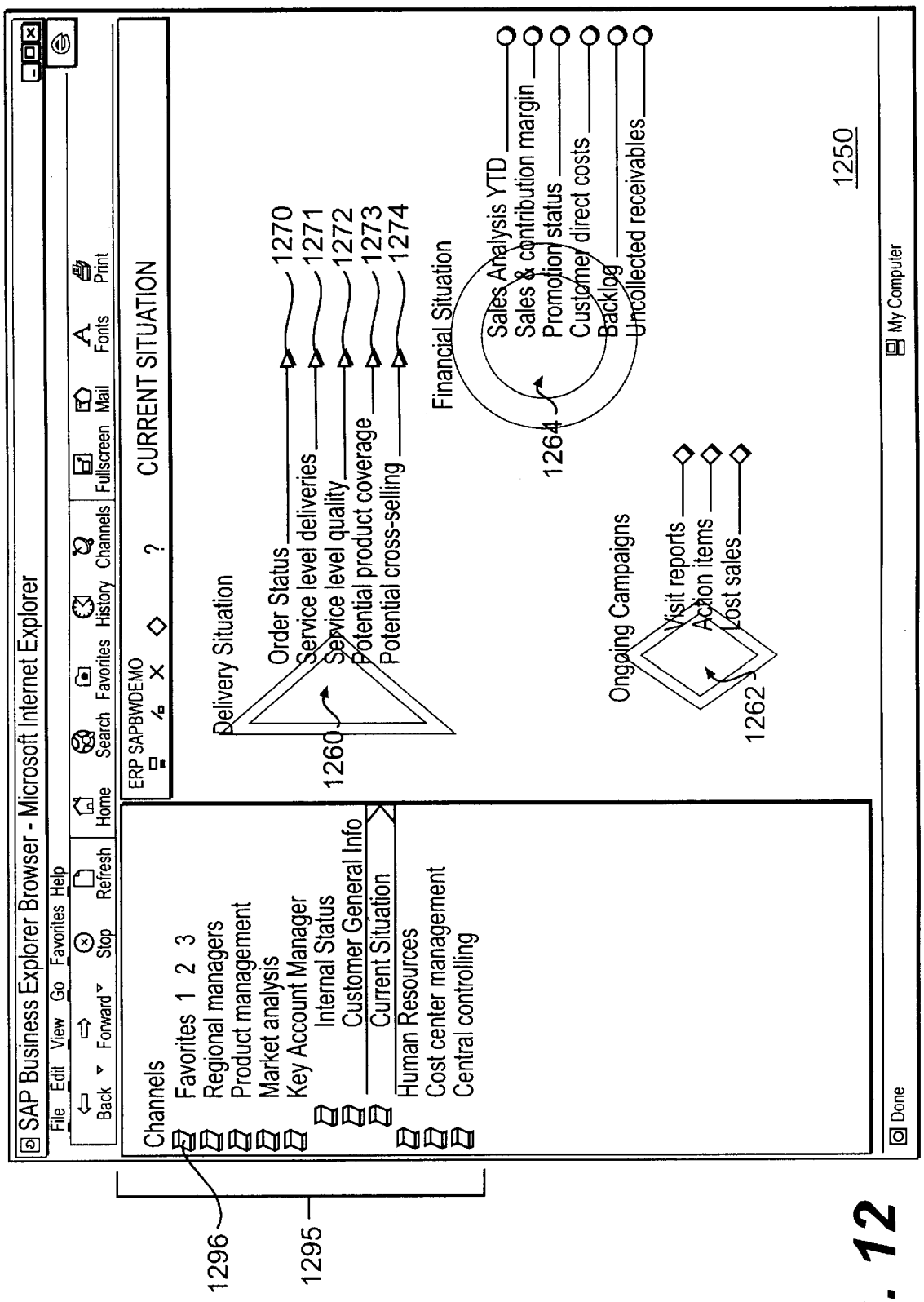
FIG. 12 is a view of a computer screen showing an alternative embodiment of the user favorites screen containing graphical representations of user-created links.

An alternative embodiment of the user favorites screen is illustrated by user favorites screen 1250 in FIG. 12. In this preferred embodiment, cluster object link 1260 is linked to object links 1270, 1271, 1272, 1273, 1274. The graphical representations of these links share the same shape, which in user favorites screen 1250 is a triangular shape. The graphical representations of other cluster object links, and the graphical representations of object links linked to them, have other shapes. For example, the graphical representation of cluster object link 1262 has a diamond shape, and the graphical representation of cluster object link 1264 has a circular shape.

In a preferred embodiment, user favorites screen 1250 is used in conjunction with channels 1295, which supply sets of data. Links to objects in public or semi-private channels may be created and organized utilizing a user favorites channel. A user may use icon 1296 to display a user favorites channel. For example, if a user clicks on icon 1296, options to display user favorites channel 1, user favorites channel 2, or user favorites channel 3 appear (these options are analogous to buttons 80, 82, 84 used to select shelves for display in FIG. 8).

A user may create a link to an object in another channel by dragging the object to icon 1296. As with user favorites screen 50, once an object link has been created and is graphically represented in user favorites screen 1250, it may be linked to a cluster object link. It is to be appreciated that the operations that may be performed on user favorites screen 50 as described above may also be performed on user favorites screen 1250.

Example of a Simplified Object Model of the User Favorites Screen

A method of creating the user favorites screen described above is to use object-oriented programming. A preferred method is to use an object-oriented programming editor, such as LINGO. It is to be appreciated by those skilled in the art that C++ and other languages having object-oriented programming capabilities may be used to create the cluster favorites screen described above. It should also be appreciated that programming languages and tools are constantly evolving, and such programming languages and tools may also be well-suited for the creation of the cluster favorites screen.

To avoid confusion, the word "Object" is capitalized in the following paragraph to distinguish it from the word "object" previously defined.

Figure 13:
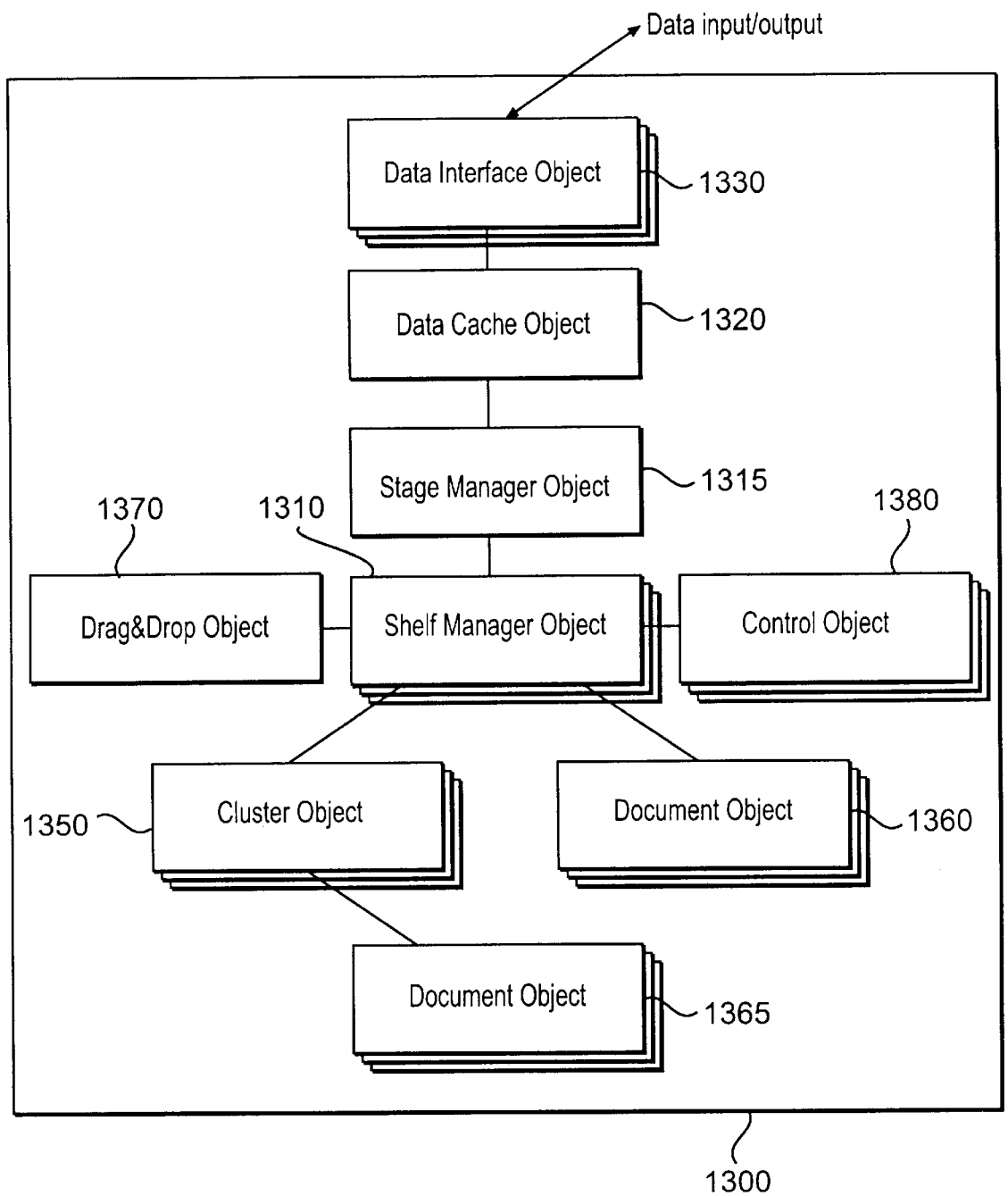
FIG. 13 is an example of a simplified object model showing how a user favorites screen containing graphical representations of user-created links may be programmed.

Referring to FIG. 13, simplified Object Model 1300 showing how the user favorites screen may be programmed is shown. Shelf Manager Object 1310 controls all instances of cluster objects and objects associated with the currently displayed shelf or user favorites channel. Stage manager object 1315 controls all the visible action on the screen and coordinates event and information streams between the acting controls. Data Cache Object 1320 allows for temporary storage of sets of retrieved data, which are obtained through Data Interface Object 1330. Cluster Object 1350 is an instance of a cluster object link, while Document Object 1360 is an instance of an object link that is not linked to a cluster object link. Document Object 1365 is an instance of an object link that is linked to a cluster object link. Drag and Drop Object 1370 allows a user to select an object or cluster object and drag it to another location. Finally, Control Object 1380 coordinates the options or commands in a popup menu to be displayed, or any other user interaction, and coordinates the taking of the proper action when an option or command is selected.

It is to be appreciated that simplified Object Model 1300 is but one way to organize the implementation of the user favorites screen.

Alternative Preferred Embodiments

In a preferred embodiment, the sets of data described above reside across a network of computers. The sets of data that reside on the Internet, or any sets of data that reside in more than one database, may be considered parts of one large database. In an alternative preferred embodiment, sets of data may reside on one computer. It will be appreciated that the invention may be practiced on one computer or over a network of computers. It will also be appreciated that a computer may receive sets of data from its own storage medium or cache, and is not limited to receiving data from other computers.

While there have been shown and described and pointed out fundamental novel features of the invention as applied to embodiments thereof, it will be understood that various omissions and substitutions and changes in the form and details of the invention, as herein disclosed, may be made by those skilled in the art without departing from the spirit of the invention. It is expressly intended that all combinations of those elements and/or method steps which perform substantially the same function in substantially the same way to achieve the same results are within the scope of the invention. It is the intention, therefore, to be limited only as indicated by the scope of the claims appended hereto.

What is claimed is:

1. A method of displaying and interacting with links to data, which data is organized in a hierarchical data structure, the method comprising the steps of:

(a) sending a first request from a graphical user interface on a computer to provide a first set of data, said first set of data being in said hierarchical data structure and having a position in said hierarchical data structure and having a associated with said position of said first set of data in said hierarchical data structure;

(b) receiving in said computer said first set of data in response to said first request;

(c) converting said first set of data to a graphical representation for visual display;

(d) displaying said graphical representation for visual display of said first set of data in a first lens displayed by said graphical user interface;

(e) sending a second request from said graphical user interface to provide a second set of data, said second set of data being in said hierarchical data structure and having a position in said hierarchical data structure and having a level associated with said position of second set of data in said hierarchical data structure;

(f) receiving in said computer said second set of data in response to said second request;

(g) comparing said level of said second set of data with said level of said first set of data to determine which level is deeper within said hierarchical data structure;

(h) converting said second set of data to a graphical representation for visual display based upon said comparing said level of said second set of data with said level of said first set of data; and (i) displaying said graphical representation for visual display of said second set of data in a second lens displayed by said graphical user interface stacked within and on top of said first lens responsive only to a determination that said level of said second set of data is deeper than said level of said first set of data in said hierarchical data structure.

2. The method of displaying and interacting with links to data of claim 1, wherein said first lens and said second lens are substantially hexagonal in shape.

3. The method of displaying and interacting with links to data of claim 1, wherein at least said second set of data contains a representation of a three-dimensional animation.

4. The method of displaying and interacting with links to data of claim 1, wherein at least said second set of data contains a representation of a virtual reality world.

5. The method of claim 1, wherein the sending of said requests and said receiving of said sets of data is via a computer network.

6. The method of claim 5, wherein the computer network is the Internet.

7. The method of claim 1, and further comprising:

discontinuing display of said graphical representation for visual display of said first set of data by said graphical user interface responsive to a determination that said level of said second set of data is equal to said level of said first set of data in said hierarchical data structure.

8. A method of displaying and interacting with links to data, which data is organized in a hierarchical data structure, the method comprising the steps of:

(a) sending a first request from a graphical user interface on a computer to provide a first set of data, said first set of data being in said hierarchical data structure and having a position in said hierarchical data structure and having a level associated with said position of said first set of data in said hierarchical data structure;

(b) receiving in said computer said first set of data in response to said first request;

(c) converting said first set of data to a graphical representation for visual display;

(d) displaying said graphical representation for visual display of said first set of data in a first lens displayed by said graphical user interface;

(e) sending a second request from said graphical user interface to provide a second set of data, said second set of data being in said hierarchical data structure and having a position in said hierarchical data structure and having a level associated with said position of said second set of data in said hierarchical data structure;

(f) receiving in said computer said second set of data in response to said second request;

(g) comparing said level of said second set of data with said level of said first set of data to determine which level is deeper within said hierarchical data structure;

(h) converting said second set of data to a graphical representation for visual display based upon said comparing said level of said second set of data with said level of said first set of data; and (i) displaying said graphical representation for visual display of said second set of data in a second lens displayed by said graphical user interface stacked within and on top of said first lens only when said level of said second set of data is deeper than said level of said first set of data in said hierarchical data structure; and wherein:

at least one of said graphical representation for visual display of said first set of data and said graphical representation for visual display of said second set of data contains a graphical representation for visual display of a category;

said category has a position in said hierarchical data structure and has a level associated with said position of said category; and said graphical representation for visual display of said category indicates whether a third set of data having a position at a deeper level than said level associated with said position of said category exists.

9. The method of claim 8, wherein the sending of said requests and said receiving of said sets of data is via a computer network.

10. The method of claim 9, wherein the computer network is the Internet.

11. The method of claim 8, and further comprising:

discontinuing display of said graphical representation for visual display of said first set of data by said graphical user interface responsive to a determination that said level of said second set data is equal to said level of said first set of data in said hierarchical data structure.

12. A method of displaying and interacting with links to data in an R/3 system, which data is organized in a hierarchical data structure, the method comprising the steps of:

(a) sending a first request from an R/3 graphical user interface on a computer to provide a first set of data, said first set of data being in said hierarchical data structure and having a position in said hierarchical data structure and having a level associated with said position of first set of data in said hierarchical data structure;

(b) receiving in said computer said first set of data in response to said first request;

(c) converting said first set of data to a graphical representation for visual display;

(d) displaying said graphical representation for visual display of said first set of data in a first lens displayed by said R/3 graphical user interface;

(e) sending a second request from said R/3 graphical user interface to provide a second set of data, said second set of data being in said hierarchical data structure and having a position in said hierarchical data structure and having a level associated with said position of second set of data in said hierarchical data structure;

(f) receiving in said computer said second set of data in response to said second request;

(g) comparing said level of said second set of data with said level of said first set of data to determine which level is deeper within said hierarchical data structure;

(h) converting said second set of data to a graphical representation for visual display based upon said comparing of said level of said second set of data with said level of said first set of data; and (i) displaying said graphical representation for visual display of said second set of data in a second lens displayed by said R/3 graphical user interface stacked within and on top of said first lens responsive only to a determination from said comparing that said level of said second set of data is deeper than said level of said first set of data in said hierarchical data structure.

13. The method of claim 12, wherein the sending of said requests and said receiving of said sets of data is via a computer network.

14. The method of claim 13, wherein the computer network is the Internet.

15. The method of claim 12, and further comprising:
discontinuing display of said graphical representation for visual display of said first set of data by said graphical user interface responsive to a determination that said level of said second set of data is equal to said level of said first set of data in said hierarchical data structure.

16. A computer system comprising a display, a central processor, a graphics processor, a memory, an input device, and a graphical user interface, wherein:

said memory has a hierarchical data structure, said hierarchical data structure having a first set of data and a second set of data, said first set of data having a position in said hierarchical data structure and having a level associated with said position of said first set of data in said hierarchical data structure, said second set of data having a position in said hierarchical data structure and having a level associated with said position of said second set of data in said hierarchical data structure;

said graphical user interface requests said first set of data;

said graphics processor receives said first set of data in response to said request for said first set of data;

said graphics processor converts said first set of data to a graphical representation for visual display;

said graphical user interface displays said graphical representation for visual display of said first set of data in a first lens on said display;

said graphical user interface requests said second set of data;

said graphical processor receives said second set of data in response to said request for said second set of data;

said central processor compares said level of said second set of data with said level of said first set of data to determine which level is deeper within said hierarchical data structure;

said graphics processor converts said second set of data to a graphical representation for visual display based upon said comparing of said level of said second set of data with said level of said first set of data; and said graphical user interface displays said graphical representation for visual display of said second set of data in a second lens stacked within and on top of said first lens on said display responsive only to a determination that said level of said second set of data is deeper than said level of said first set of data.

17. The computer system of claim 16, wherein said first lens and said second lens are substantially hexagonal in shape.

18. The computer system of claim 16, wherein said central processor and said graphics processor are the same processor.

19. The computer system of claim 16, wherein at least said second set of data contains a representation of a three-dimensional animation.

20. The computer system of claim 16, wherein at least said second set of data contains a representation of a virtual reality world.

21. The computer system of claim 16, wherein said graphical user interface operates in conjunction with an instance of SAP Business Information Warehouse.

22. The computer system of claim 16, wherein said graphical user interface displays a context-sensitive pop-up menu, based on attributes of said second set of data and based on an authorization level.

23. The computer system of claim 16, wherein said graphical user interface is imbedded in a container.

24. The system of claim 16, wherein the sets of data are requested and received over a computer network.

25. The system of claim 24, wherein the computer network is the Internet.

26. The system of claim 16, wherein said graphical user interface discontinues display of said graphical representation for visual display of said first set of data responsive to a determination that said level of said second set of data is equal to said level of said first set of data in said hierarchical data structure.

27. A computer system comprising a display, a central processor, a graphics processor, a memory, an input device, and a graphical user interface, wherein:

said memory has a hierarchical data structure, said hierarchical data structure having a first set of data and a second set of data, said first set of data having a position in said hierarchical data structure and having a level associated with said position of said first set of data in said hierarchical data structure, said second set of data having a position in said hierarchical data structure and having a level associated with said position of said second set of data in said hierarchical data structure;

said graphical user interface requests said first set of data;

said graphics processor receives said first set of data in response to said request for said first set of data;

said graphics processor converts said first set of data to a graphical representation for visual display;

said graphical user interface displays said graphical representation for visual display of said first set of data in a first lens on said display;

said graphical user interface requests said second set of data;

said graphical processor receives said second set of data in response to said request for said second set of data;

said central processor compares said level of said second set of data with said level of said first set of data to determine which level is deeper within said hierarchical data structure;

said graphics processor converts said second set of data to a graphical representation for visual display based upon said comparing said level of said second set of data with said level of said first set of data; and said graphical user interface displays said graphical representation for visual display of said second set of data in a second lens stacked within and on top of said first lens on said display only when said level of said second set of data is deeper than said level of said first set of data; and wherein:

at least one of said graphical representation for visual display of said first set of data and said graphical representation for visual display of said second set of data contains a graphical representation for visual display of a category;

said category has a position in said hierarchical data structure and has a level associated with said position of said category; and said graphical representation for visual display of said category indicates whether a third set of data having a position at a deeper level than said level associated with said position of said category exists.

28. The system of claim 27, wherein the sets of data are requested and received over a computer network.

29. The system of claim 28, wherein the computer network is the Internet.

30. The system of claim 27, wherein said graphical user interface discontinues display of said graphical representation for visual display of said first set of data responsive to a determination that said level of said second set of data is equal to said level of said first set of data in said hierarchical data structure.

31. A method of displaying sets of data organized in a hierarchical data structure, the method comprising displaying a plurality of lenses, each lens having a size, wherein:

each said lens is associated with a respective set of data, each said set of data being in said hierarchical data structure and each having a position in said hierarchical data structure and each having a level associated with said position of said set of data in said hierarchical data structure; and said size of each said lens being determined based on said level of said set of data associated with said lens so that one of said lenses is smaller than another of said lenses where said one of said lenses is associated with a set of data having a deeper level in the hierarchical data structure than the level of the set of data associated with said another of said lenses.

32. The method of displaying data organized in a hierarchical data structure of claim 31, wherein each said lens has a label.

33. The method of displaying data organized in a hierarchical data structure of claim 31, further comprising selecting any one of said plurality of lenses using a graphical user interface, displaying said any one of said plurality of lenses, and displaying said set of data associated with said any one of said plurality of lenses.

34. The method of displaying data organized in a hierarchical data structure of claim 31, wherein at least said one of said lenses is associated with data containing a representation of a three-dimensional animation.

35. The method of displaying data organized in a hierarchical data structure of claim 31, wherein at least said one of said lenses is associated with data that contains a representation of a virtual reality world.

36. The method of displaying data organized in a hierarchical data structure of claim 31, wherein each said lens is substantially hexagonal in shape.

37. The method of claim 31, wherein the sets of data are requested and received from the hierarchical data structure over a computer network.

38. The method of claim 37, wherein the computer network is the Internet.

39. The method of claim 31, and further comprising:

discontinuing display of one of said lenses responsive to a determination that said level of the set of data associated therewith is equal to said level of the set of data associated with another lens to be displayed.

40. A computer system for displaying and interacting with data organized in a hierarchical data structure, which comprises:

(a) means for sending a first request from a graphical user interface on a computer to provide a first set of data, said first set of data being in said hierarchical data structure and having a position in said hierarchical data structure and having a level associated with said position of said first set of data in said hierarchical data structure;

(b) means for receiving in said computer said first set of data in response to said first request;

(c) means for converting said first set of data to a graphical representation for visual display;

(d) means for displaying said graphical representation for visual display of said first set of data in a first lens displayed by said graphical user interface;

(e) means for sending a second request from said graphical user interface to provide a second set of data, said second set of data being in said hierarchical data structure and having a position in said hierarchical data structure and having a level associated with said position of second set of data in said hierarchical data structure;

(f) means for receiving in said computer said second set of data in response to said second request;

(g) means for comparing said level of said second set of data with said level of said first set of data to determine which level is deeper within said hierarchical data structure;

(h) means for converting said second set of data to a graphical representation for visual display based upon said comparing of said level of said second set of data with said level of said first set of data; and (i) means for displaying said graphical representation for visual display of said second set of data in a second lens displayed by said graphical user interface stacked within and on top of said first lens responsive only to a determination that said level of said second set of data is deeper than said level of said first set of data in said hierarchical data structure.

41. The computer system of claim 40, wherein said first lens and said second lens are substantially hexagonal in shape.

42. The computer system of claim 40, wherein at least said second set of data contains a representation of a three-dimensional animation.

43. The computer system of claim 40, wherein at least said second set of data contains a representation of a virtual reality world.

44. The computer system of claim 40, wherein said graphical user interface operates in conjunction with an instance of SAP Business Information Warehouse.

45. The computer system of claim 40, wherein said graphical user interface displays a context-sensitive pop-up menu, based on attributes of said second set of data and based on an authorization level.

46. The computer system of claim 40, wherein said graphical user interface is imbedded in a container.

47. The system of claim 40, wherein the sets of data are requested and received over a computer network.

48. The system of claim 47, wherein the computer network is the Internet.

49. The system of claim 40, and further comprising:

means for discontinuing display of said graphical representation for visual display of said first set of data by said graphical user interface responsive to a determination that said level of said second set of data is equal to said level of said first set of data in said hierarchical data structure.

50. A computer system for displaying and interacting with data organized in a hierarchical data structure, which comprises:

(a) means for sending a first request from a graphical user interface on a computer to provide a first set of data, said first set of data being in said hierarchical data structure and having a position in said hierarchical data structure and having a level associated with said position of said first set of data in said hierarchical data structure;

(b) means for receiving in said computer said first set of data in response to said first request;

(c) means for converting said first set of data to a graphical representation for visual display;

(d) means for displaying said graphical representation for visual display of said first set of data in a first lens displayed by said graphical user interface;

(e) means for sending a second request from said graphical user interface to provide a second set of data, said second set of data being in said hierarchical data structure and having a position in said hierarchical data structure and having a level associated with said position of said second set of data in said hierarchical data structure;

(f) means for receiving in said computer said second set of data in response to said second request;

(g) means for comparing said level of said second set of data with said level of said first set of data to determine which level is deeper within said hierarchical data structure;

(h) means for converting said second set of data to a graphical representation for visual display based upon said comparing said level of said second set of data with said level of said first set of data; and (i) means for displaying said graphical representation for visual display of said second set of data in a second lens displayed by said graphical user interface stacked within and on top of said first lens only when said level of said second set of data is deeper than said level of said first set of data in said hierarchical data structure; and wherein:

at least one of said graphical representation for visual display of said first set of data and said graphical representation for visual display of said second set of data contains a graphical representation for visual display of a category;

said category has a position in said hierarchical data structure and has a level associated with said position of said category; and said graphical representation for visual display of said category indicates whether a third set of data having a position at a deeper level than said level associated with said position of said category exists.

* * * * *

UNITED STATES PATENT AND TRADEMARK OFFICE
CERTIFICATE OF CORRECTION

PATENT NO. : 6,278,991 B1  Page 1 of 1
DATED      : August 21, 2001
INVENTOR(S) : Peter Ebert It is certified that error appears in the above-identified patent and that said Letters Patent is hereby corrected as shown below:

Column 13,
Line 14, before "associated" insert -- level --.
Line 27, before "second" insert -- said --.

Column 15,
Line 2, before "first" insert -- said --.
Line 15, before "second" insert -- said --.

Column 16,
Line 1, change "graphical" to -- graphics --.

Column18,
Line 42, before "second" insert -- said --.

Signed and Sealed this

Eighteenth Day of June, 2002

Attest:

JAMES E. ROGAN
Attesting Officer    Director of the United States Patent and Trademark Office